UNITED STATES PATENT OFFICE.

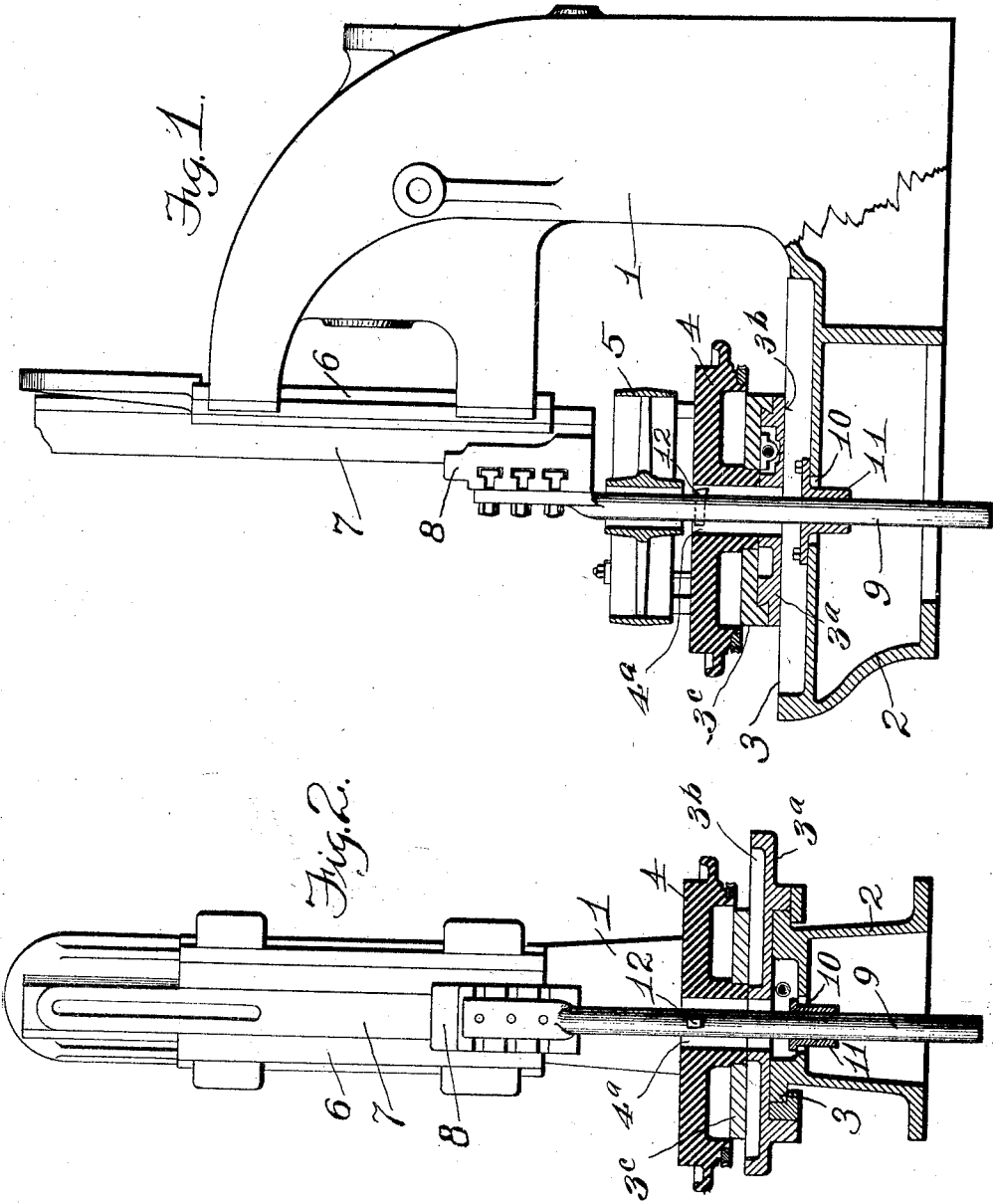

WILLIAM JOSEPH HAGMAN, OF PHILADELPHIA, PENNSYLVANIA, ASSIGNOR TO NILES-BEMENT-POND COMPANY, OF JERSEY CITY, NEW JERSEY.

SLOTTING-MACHINE.

972,367. Specification of Letters Patent. Patented Oct. 11, 1910.

Application filed March 1, 1909. Serial No. 480,641.

*To all whom it may concern:*

Be it known that I, WILLIAM JOSEPH HAGMAN, a citizen of the United States, residing at Philadelphia, Philadelphia county, Pennsylvania, have invented certain new and useful Improvements in Slotting-Machines, of which the following is a specification.

This invention, relating to improvements in slotting machines to adapt such machines for the key-seating of wheels, will be readily understood from the following description taken in connection with the accompanying drawing in which—

Figure 1 is a side elevation, part vertical section, through the main portions of a slotting machine embodying my invention, and Fig. 2 a front elevation, part vertical section, of the same.

In the drawing: 1, indicates a frame upright of an ordinary slotting machine: 2, its knee: 3, the saddle guides at the top of the knee: 3ª, a carriage arranged to move horizontally on said guides; 3ᵇ, horizontal guides on the carriage arranged transversely to guides 3; 3ᶜ, a slide mounted to move horizontally on guides 3ᵇ; 4, a work-holding table rotatably mounted on slide 3ᶜ; the table, slide 3ᶜ and carriage 3ª being provided with a central opening 4ª to accommodate the tool bar; 6, a ram guide: 7, a ram sliding therein: 8, a tool-holder at the foot of the ram: 9, a vertically disposed tool-bar passing through the vertical opening in the table and having its upper end firmly secured to the tool-holder: 10, an opening in the top of the knee below the opening in the table: 11, a bushing firmly secured in the opening 10 and snugly fitting the tool-bar: and 12, the tool secured in a transverse mortise in the tool-bar and adapted, during the motion of the reciprocating parts of the machine, to operate within the hub of the wheel.

The tool-bar is to be somewhat smaller than the diameter of the bore of the wheel in which it is to work, and the tool will be of such length that, while projecting its cutting end from the side of the bar it may still pass down through the bore of the wheel.

After a wheel 5 is secured on the table, the bore of the wheel hub in which it is desired to cut a slot, and the opening 4ª in the table and its supporting members, are centered in relation to the bushing 11 by movement of the carriage 3ᵇ on its guides and by transverse movement of the slide 3ᶜ on its guides. While the tool is in idle reciprocation through the bore of the wheel, the table is then moved by proper movement of the carriage and slide in the direction toward the cutting end of the tool a sufficient distance to enable the tool to take a cut in the wheel bore, and this movement is repeated at each cutting stroke until the key seat is completed.

The table 4 may be rotated by suitable devices to provide for the proper width of slot or to bring a new portion of the wheel bore into position to be cut.

When the work of the tool-bar is done and it is desired to remove it from the machine the removal is effected without disturbance of bushing 11. The bushing 11 is to be removed and another substituted when called for by the employment of a different size tool-bar.

I claim:—

In a slotting machine the combination of a frame having a base provided with guides and a horizontal web between the guides, said web being provided with an aperture, a bushing secured to the web in said aperture, a longitudinally movable carriage mounted on said guides, a slide on the carriage engaging guides thereon arranged transversely to the guides first mentioned, a work holding table rotatably mounted on said slide and a vertical tool bar passing through said bushing, the carriage slide and table being centrally apertured to accommodate the tool bar and capable of adjustment by means of the said guides to locate said aperture in relation to said bushing.

WILLIAM JOSEPH HAGMAN.

Witnesses:
AUGUSTINE SOLIMEO,
F. T. MILES.